(12) United States Patent
Iida

(10) Patent No.: US 6,825,825 B2
(45) Date of Patent: Nov. 30, 2004

(54) SMOOTHING METHOD, SMOOTHING CIRCUIT, IMAGE FORMING APPARATUS AND DISPLAY UNIT

(75) Inventor: Masaru Iida, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 338 days.

(21) Appl. No.: 10/073,315

(22) Filed: Feb. 13, 2002

(65) Prior Publication Data

US 2003/0011617 A1 Jan. 16, 2003

(30) Foreign Application Priority Data

Jul. 13, 2001 (JP) ........................................ 2001-214060

(51) Int. Cl.$^7$ ................................................ G09G 3/36
(52) U.S. Cl. ............................ 345/96; 345/94; 345/95
(58) Field of Search ............................... 345/58, 89, 94, 345/95, 96, 100, 147–149, 204, 211, 212, 505, 501, 503, 522; 382/441, 154, 181; 395/102

(56) References Cited

U.S. PATENT DOCUMENTS

| | | | |
|---|---|---|---|
| 5,774,133 A | * | 6/1998 | Neave et al. ............... 345/505 |
| 5,896,489 A | * | 4/1999 | Wada ......................... 358/1.2 |
| 6,144,373 A | * | 11/2000 | Nakazawa et al. .......... 345/204 |
| 6,611,617 B1 | * | 8/2003 | Crampton .................... 382/154 |

* cited by examiner

Primary Examiner—Vijay Shankar
Assistant Examiner—Prabodh Dharia
(74) Attorney, Agent, or Firm—Westerman, Hattori, Daniels & Adrian, LLP

(57) ABSTRACT

A smoothing method selectively outputs one of an extracted window pattern which is obtained by extracting a region having a predetermined size with a target pixel formed by each pixel of an input image data and an inverted window pattern which is obtained by inverting a polarity of each pixel of the extracted window pattern, collates an output window pattern which is output with a plurality of collating templates, and outputs corrected dot data corresponding to one of the collating templates matching the output window pattern, and selectively outputs one of the corrected dot data and an inverted corrected dot data which is obtained by inverting a polarity of each dot of the corrected dot data.

19 Claims, 16 Drawing Sheets

FIG.3

| PATTERN NUMBER | COLLATING NUMBER | CORRECTED DOT OUTPUT | PATTERN NUMBER | COLLATING NUMBER | CORRECTED DOT OUTPUT |
|---|---|---|---|---|---|
| 0301 | | | 0302 | | |
| 0303 | | | 0304 | | |
| 0305 | | | 0306 | | |
| 0307 | | | 0308 | | |
| 0311 | | | 0312 | | |
| 0313 | | | 0314 | | |
| 0315 | | | 0316 | | |
| 0317 | | | 0318 | | |
| 0321 | | | 0322 | | |
| 0323 | | | 0324 | | |
| 0331 | | | 0332 | | |
| 0333 | | | 0334 | | |

| PATTERN NUMBER | COLLATING NUMBER | CORRECTED DOT OUTPUT | PATTERN NUMBER | COLLATING NUMBER | CORRECTED DOT OUTPUT |
|---|---|---|---|---|---|
| P301 | | | P302 | | |
| P303 | | | P304 | | |
| P305 | | | P306 | | |
| P307 | | | P308 | | |
| P311 | | | P312 | | |
| P313 | | | P314 | | |

SMOOTHING METHOD, SMOOTHING CIRCUIT, IMAGE FORMING APPARATUS AND DISPLAY UNIT

BACKGROUND OF THE INVENTION

This application claims the benefit of a Japanese Patent Application No. 2001-214060 filed Jul. 13, 2001, in the Japanese Patent Office, the disclosure of which is hereby incorporated by reference.

1. Field of the Invention

The present invention generally relates to smoothing methods, smoothing circuits, image forming apparatuses and display units, and more particularly to a smoothing method and a smoothing circuit for obtaining high-quality image data by eliminating jaggy or the like from the image data, and to an image forming apparatus and a display unit which employ such a smoothing method.

Image data generated by a computer or the like are output by an image output apparatus such as a printer and a display unit. Recently, there are increased demands to output clearer and sharper images, and the resolution of the image output apparatuses such as printers and display units have improved considerably.

In order to more effectively utilize the image output apparatus having such an improved resolution, a smoothing process is carried out. The smoothing process is an image quality improving process for making jagged pixels (dots) less inconspicuous, that is, for making the jaggy less conspicuous, in a case where the image is made up of characters or lines. This smoothing process becomes necessary when outputting the image data having a relatively low resolution as image data having a high resolution. For example, the image data having the relatively low resolution are developed into an image in the computer or transmitted by a communication means such as a facsimile machine.

2. Description of the Related Art

FIG. 1 is a system block diagram for explaining an example of a conventional smoothing circuit. The smoothing circuit shown in FIG. 1 generally includes an input image buffer 1, a template matching circuit 2, and a flip-flop (FF) 3. Such a smoothing circuit is proposed in a Japanese Laid-Open Patent Application No. 2000-358149, for example.

As shown in FIG. 1, a rectangular region having a predetermined size is extracted as an extracted window pattern 5 from a binary input image data which is input to an input image buffer 1. An image input clock which is used to synchronize the operation timings is input to the input image buffer 1 and the flip-flop which will be described later. The template matching circuit 2 collates the window pattern 5 with a predetermined collating template group 6 which is stored within the template matching circuit 2. Each collating template of the collating template group 6 has a pattern for extracting features of contour portions, and includes corrected dot data in correspondence with the features of the respective contour portions. If there exists a collating template which matches the input window pattern, the template matching circuit 2 outputs the corrected dot data of the matching collating template via the flip-flop 3. The corrected dot data which is output has a dot pattern for making a dot correction with respect to a target pixel 7 which is located at the center of the extracted rectangular region, and the image quality is improved thereby.

FIGS. 2A and 2B are diagrams for explaining the smoothing process which is carried out by the smoothing circuit shown in FIG. 1. By carrying out the smoothing process by the smoothing circuit, a stepped contour having a low resolution as shown in FIG. 2A is formed into a smoother contour shown in FIG. 2B having a resolution which is improved to four times that of the stepped contour shown in FIG. 2A, by dot interpolation. The features of this contour portion can easily be extracted, by storing within the template matching circuit 2 collating templates which are dependent on the patterns of each of the contours.

FIG. 3 is a diagram showing collating template patterns and corresponding corrected dot outputs for some of pattern numbers. More particularly, FIG. 3 shows the collating template patterns (collating patterns) of the collating template group 6 for carrying out the dot interpolation described above in conjunction with FIGS. 2A and 2B by extracting the extracted window pattern 5 which is made up of 5 pixels×5 pixels of the input image data, and the corresponding corrected dot outputs, for some of pattern numbers 0301 through 0334. The collating templates shown in FIG. 3 are used for the dot interpolation of the image data shown in FIG. 2A and the image data which is obtained by rotating the image data shown in FIG. 2A by 180 degrees.

In the collating patterns shown FIG. 3, a symbol "•" indicates a pixel position which is not included in the target of the pattern matching, a symbol "●" indicates a position of a black pixel, a symbol "○" indicates the position of a white pixel, and a center of the collating pattern indicates a pixel which is the target of the correction.

According to the conventional smoothing process which uses the template matching, it is necessary to prepare a large number of collating patterns in order to obtain a large image quality improving effect. In addition, in order to further improve the image quality, it is necessary to extract a window pattern which is as large as possible. However, as the extracted window pattern becomes larger, the number of collating patterns which must be prepared in advance increases. As a result, an extremely large memory capacity is required in order to store the collating template group 6 in the template matching circuit 2 and the scale of the associated logic circuits becomes extremely large, thereby making it difficult to realize an inexpensive smoothing circuit.

On the other hand, the accuracy with which the features of the contour can be detected deteriorates if the number of collating patterns is limited, thereby making it difficult to obtain a large image quality improving effect when the number of collating patterns is limited.

SUMMARY OF THE INVENTION

Accordingly, it is a general object of the present invention to provide a novel and useful smoothing method, smoothing circuit, image forming apparatus and display unit, in which the problems described above are eliminated.

Another and more specific object of the present invention is to provide a smoothing method, a smoothing circuit, an image forming apparatus and a display unit which can extract features of a contour with a high accuracy by using a small number of collating patterns, and can obtain a large image quality improving effect using a relatively simple and inexpensive structure.

Still another object of the present invention is to provide a smoothing method comprising the steps of (a) selectively outputting one of an extracted window pattern which is obtained by extracting a region having a predetermined size with a target pixel formed by each pixel of an input image data, and an inverted window pattern which is obtained by inverting a polarity of each pixel of the extracted window pattern; (b) collating an output window pattern which is output by the step (a) with a plurality of collating templates, and outputting corrected dot data corresponding to one of the collating templates matching the output window pattern; and (c) selectively outputting one of the corrected dot data output by the step (b), and an inverted corrected dot data which is obtained by inverting a polarity of each dot of the corrected dot data. According to the smoothing method of the present invention, it is possible to extract features of a contour with a high accuracy by using a small number of collating patterns, and can obtain a large image quality improving effect using a relatively simple and inexpensive structure.

A further object of the present invention is to provide a smoothing circuit comprising a window pattern conversion circuit which receives an extracted window pattern which is obtained by extracting a region having a predetermined size with a target pixel formed by each pixel of an input image data, and selectively outputs one of the extracted window pattern and an inverted window pattern which is obtained by inverting a polarity of each pixel of the extracted window pattern; a template matching circuit which collates an output window pattern which is output by the window pattern conversion circuit with a plurality of collating templates, and outputs corrected dot data corresponding to one of the collating templates matching the output window pattern; and a dot data conversion circuit which selectively outputs one of the corrected dot data output by the template matching circuit, and an inverted corrected dot data which is obtained by inverting a polarity of each dot of the corrected dot data. According to the smoothing circuit of the present invention, it is possible to extract features of a contour with a high accuracy by using a small number of collating patterns, and can obtain a large image quality improving effect using a relatively simple and inexpensive structure.

Another object of the present invention is to provide an image forming apparatus comprising a smoothing circuit; and an image forming section which forms an image on a recording medium based on an output of the smoothing circuit, wherein the smoothing circuit comprises a window pattern conversion circuit which receives an extracted window pattern which is obtained by extracting a region having a predetermined size with a target pixel formed by each pixel of an input image data, and selectively outputs one of the extracted window pattern and an inverted window pattern which is obtained by inverting a polarity of each pixel of the extracted window pattern; a template matching circuit which collates an output window pattern which is output by the window pattern conversion circuit with a plurality of collating templates, and outputs corrected dot data corresponding to one of the collating templates matching the output window pattern; and a dot data conversion circuit which selectively outputs one of the corrected dot data output by the template matching circuit, and an inverted corrected dot data which is obtained by inverting a polarity of each dot of the corrected dot data. According to the image forming apparatus of the present invention, it is possible to extract features of a contour with a high accuracy by using a small number of collating patterns, and can obtain a large image quality improving effect using a relatively simple and inexpensive structure.

Still another object of the present invention is to provide a display unit comprising a smoothing circuit; and a display section which displays an image based on an output of the smoothing circuit, wherein the smoothing circuit comprises a window pattern conversion circuit which receives an extracted window pattern which is obtained by extracting a region having a predetermined size with a target pixel formed by each pixel of an input image data, and selectively outputs one of the extracted window pattern and an inverted window pattern which is obtained by inverting a polarity of each pixel of the extracted window pattern; a template matching circuit which collates an output window pattern which is output by the window pattern conversion circuit with a plurality of collating templates, and outputs corrected dot data corresponding to one of the collating templates matching the output window pattern; and a dot data conversion circuit which selectively outputs one of the corrected dot data output by the template matching circuit, and an inverted corrected dot data which is obtained by inverting a polarity of each dot of the corrected dot data. According to the display unit of the present invention, it is possible to extract features of a contour with a high accuracy by using a small number of collating patterns, and can obtain a large image quality improving effect using a relatively simple and inexpensive structure.

Therefore, the present invention can carry out a smoothing process (dot correction) equivalent to that of a conventional smoothing circuit by using only one-half the number of collating templates required by the conventional smoothing circuit. In other words, it is possible to extract the features of the contour with a high accuracy and to obtain a high-quality image, using a small number of collating templates. In addition, because the number of collating templates required is reduced compared to that of the conventional smoothing circuit, the present invention can simplify the structure and reduce the cost of the smoothing circuit. Moreover, it is possible to add different collating templates for the purposes of further improving the image quality using approximately the same number of collating templates as the conventional smoothing circuit.

Furthermore, the present invention can realize a smoothing process (dot correction) which is equivalent to that of the conventional smoothing circuit, using one-half the number of collating templates required by the conventional smoothing circuit, and by carrying out only one template collating cycle per pixel of the input image data. For this reason, the present invention can realize a high-speed smoothing process using a small number of collating templates to realize a high-quality image.

Other objects and further features of the present invention will be apparent from the following detailed description when read in conjunction with the accompanying drawings.

BRIEF DESCRIPTION OF THE DRAWINGS

FIG. 3 is a diagram showing collating template patterns and corresponding corrected dot outputs for some of pattern numbers;

DESCRIPTION OF THE PREFERRED EMBODIMENTS

A description will be given of various embodiments of a smoothing method according to the present invention and a smoothing circuit according to the present invention, by referring to FIG. 4 and subsequent drawings.

Figure 4:
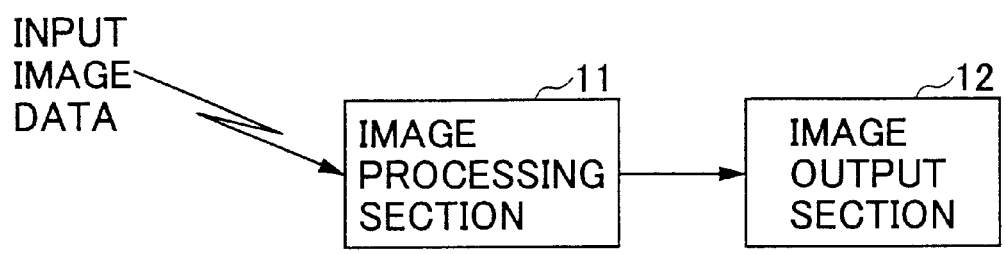
FIG. 4 is a system block diagram showing a general structure of an image output apparatus to which the present invention may be applied.

FIG. 4 is a system block diagram showing a general structure of an image output apparatus which may be applied with the present invention. The image output apparatus shown in FIG. 4 includes an image processing section 11 which receives input image data, and an image output section 12 which outputs image data which has been subjected to a predetermined process such as a smoothing process by the image processing section 11. The image output section 12 is formed by a display unit which displays the process image data or, an image forming apparatus such as a printer which forms the process image data on a recording medium such as paper.

Figure 5:
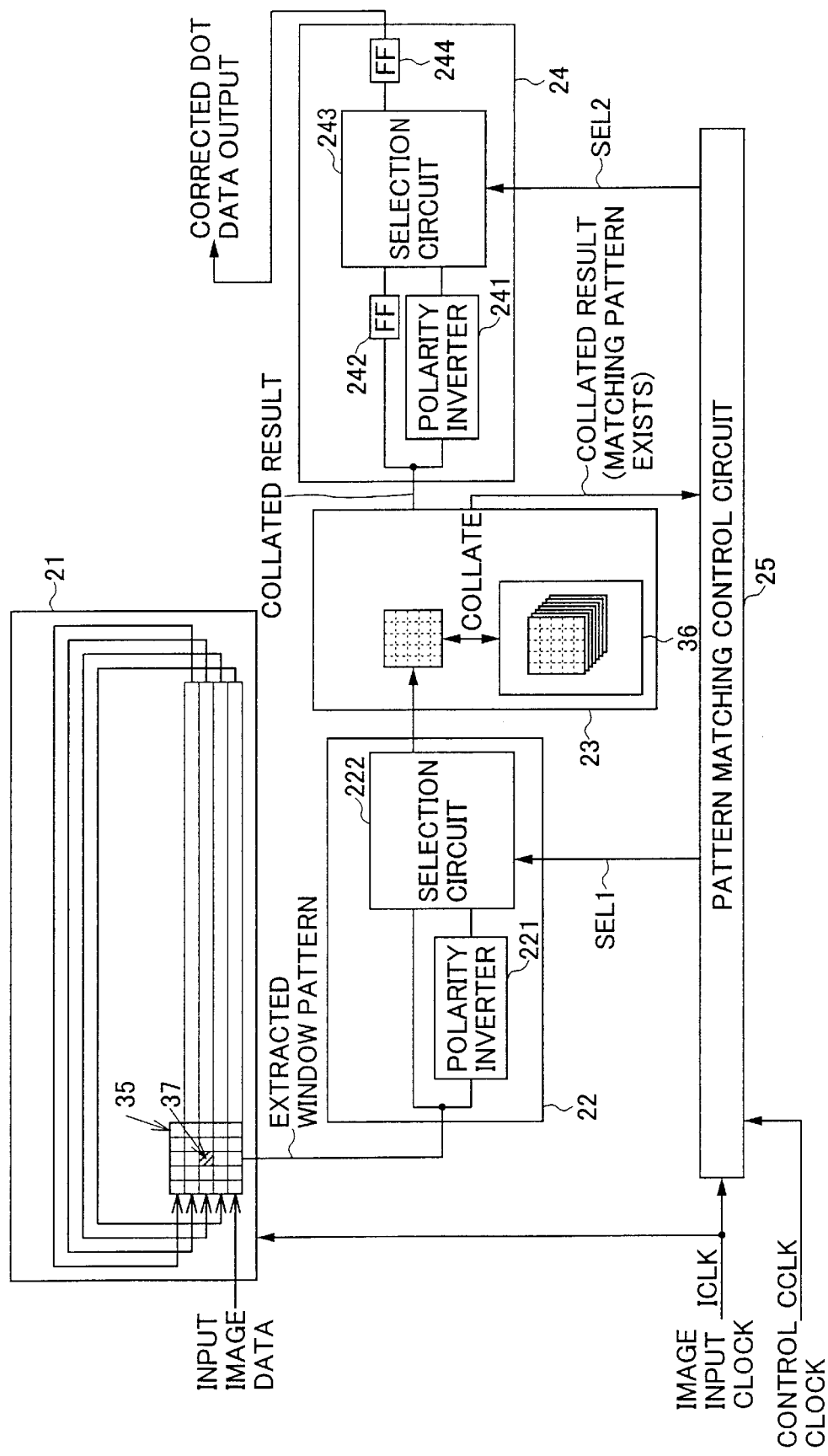
FIG. 5 is a system block diagram showing a first embodiment of a smoothing circuit according to the present invention.

FIG. 5 is a system block diagram showing a first embodiment of the smoothing circuit according to the present invention. This first embodiment of the smoothing circuit employs a first embodiment of the smoothing method according to the present invention. The smoothing circuit shown in FIG. 5 generally includes an input image buffer 21, a window pattern conversion circuit 22, a template matching circuit 23, a dot data conversion circuit 24, and a pattern matching control circuit 25. As will be described later, the window pattern conversion circuit 22 includes a polarity inverter circuit 221 and a selection circuit 222. In addition, the dot data conversion circuit 24 includes a polarity inverter circuit 241, flip-flops (FFs) 242 and 244, and a selection circuit 243.

Figure 1:
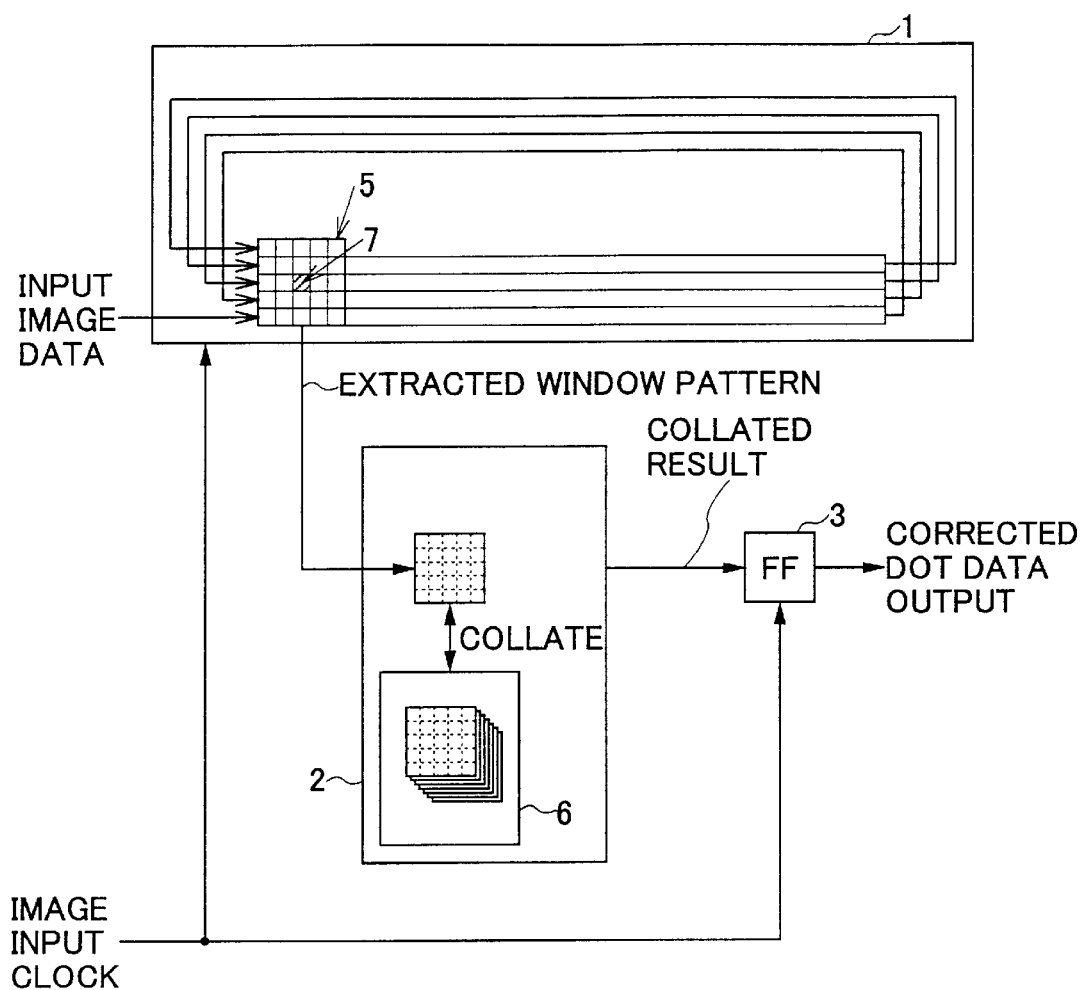
FIG. 1 is a system block diagram showing an example of a conventional smoothing circuit.

In FIG. 5, the input image buffer 21 has a structure which is the same as that of the counterpart of the conventional smoothing circuit shown in FIG. 1, and includes a shift register which successively inputs the pixel data of the low-resolution image data in synchronism with an image input clock ICLK. A pattern of a predetermined rectangular region having a target pixel 37 at the center is extracted from the pixel data within the input image buffer 21, and is successively output to the window pattern conversion circuit 22 as an extracted window pattern 35. In this embodiment, it is assumed for the sake of convenience that the extracted rectangular region has a size of 5 pixels×5 pixels.

The window pattern conversion circuit 22 includes the polarity inverter circuit 221 which generates an inverted window pattern 35I by inverting the polarity of each pixel in the extracted window pattern 35, and the selection circuit 222 which selectively outputs one of the input extracted window pattern 35 and the inverted window pattern 35I depending on a selection signal SEL1 which is included in control signals output from the pattern matching control circuit 35.

Figure 6:
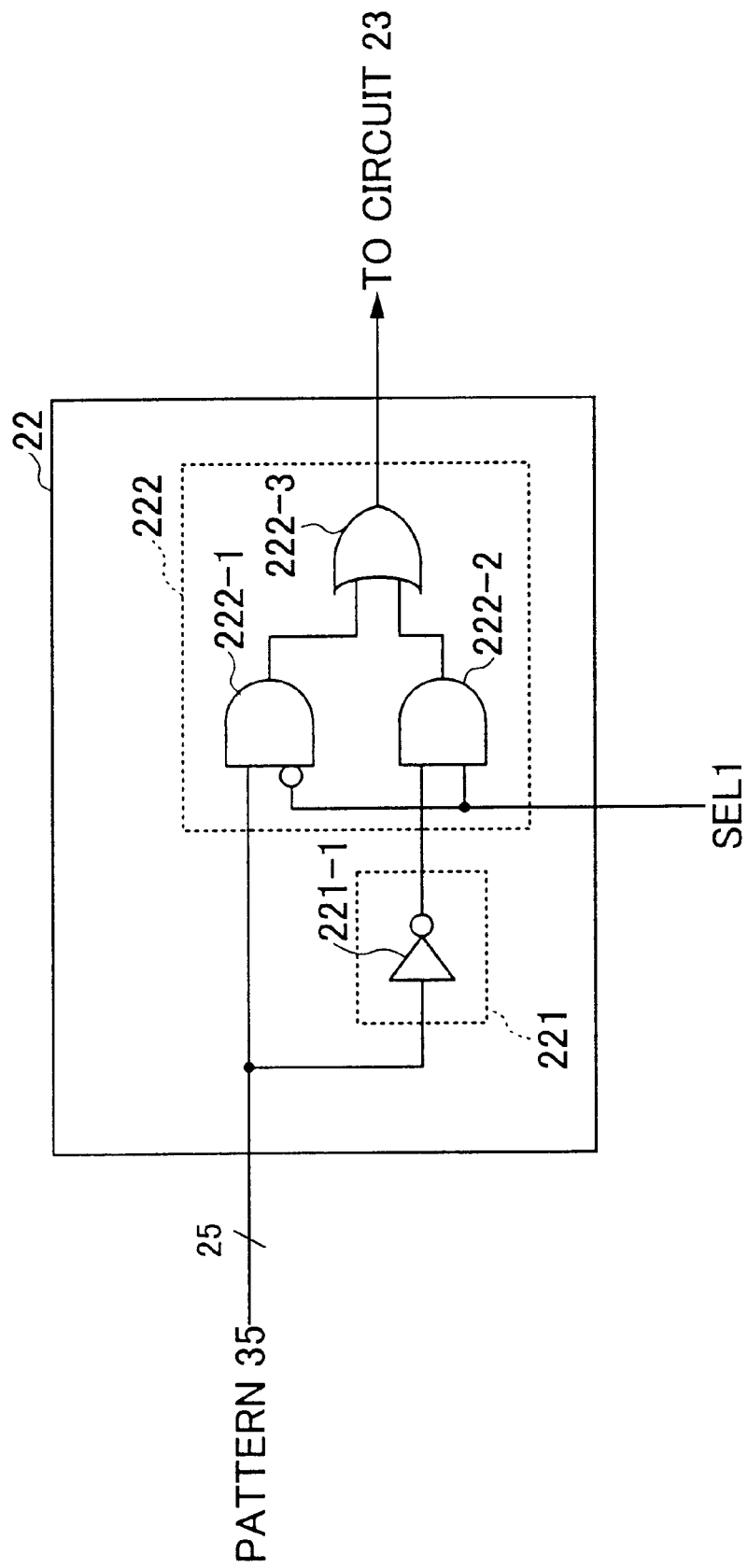
FIG. 6 is a circuit diagram showing a structure of a window pattern conversion circuit.

FIG. 6 is a circuit diagram showing the structure of the window pattern conversion circuit 22. As shown in FIG. 6, the polarity inverter circuit 221 includes an inverter 221-1. The selection circuit 222 includes AND circuits 222-1 and 222-2, and an OR circuit 222-3 which are connected as shown in FIG. 6. In the window pattern conversion circuit 22 shown in FIG. 6, the extracted window pattern 35 is output as it is (that is, a non-conversion output is made) from the selection circuit 222 during a low-level period of the selection signal SEL1, and the inverted window pattern 35I is output (that is, a converted or inverted output is made) from the selection circuit 222 during a high-level period of the selection signal SEL1.

The template matching circuit 23 has a structure which is the same as that of the counterpart of the conventional smoothing circuit shown in FIG. 1. Each collating template of the collating template group 36 has a pattern for extracting a feature of the contour portion, and has corrected dot data corresponding to the feature of the contour portion. In other words, each collating template of the collating template group 36 includes a collating template pattern (collating pattern) and a corresponding corrected dot data. The template matching circuit 23 collates the input extracted window pattern 35 and each collating pattern of the collating template group 36, and outputs a collated result to the dot data conversion circuit 24. The collated result includes the corrected dot pattern of the collating pattern which matches the extracted window pattern 35, and a match signal which indicates that the collating pattern matches the extracted window pattern 35. When there is no collating pattern (collating template pattern) which matches the extracted window pattern 35, the template matching circuit 23 outputs a dot pattern which is not corrected, depending on the pixel data at the position of the target pixel 37 of the input extracted window pattern 35.

In this embodiment, the collating template group 36 of the template matching circuit 23 includes only the collating patterns having a white pixel at the position of the target pixel or, only the collating patterns having a black pixel at the position of the target pixel.

Figure 7:
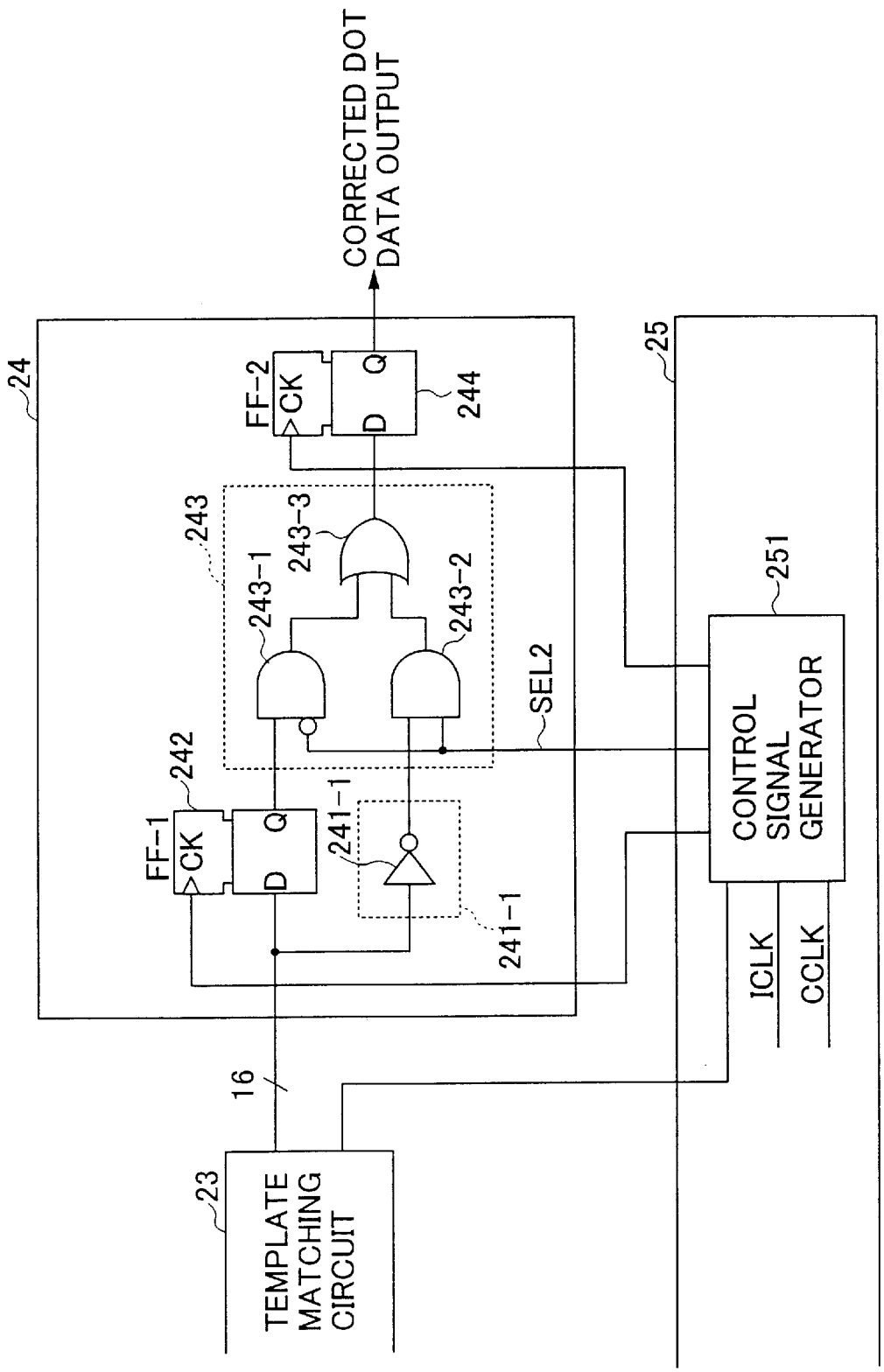
FIG. 7 is a circuit diagram showing a structure of a dot data conversion circuit.

The dot data conversion circuit 24 includes the polarity inverter section 241 which generates an inverted dot pattern by inverting the polarity of each dot of the corrected dot pattern input from the template matching circuit 23, the selection circuit 243 which selectively outputs one of the input corrected dot pattern and the inverted dot pattern depending on a selection signal SEL2 included in the control signals which are output from the pattern matching control circuit 25, and the flip-flops 242 and 244 which temporarily store the data. The flip-flops 242 and 244 are provided to output the corrected dot data in synchronism with the image input clock ICLK. FIG. 7 is a circuit diagram showing a structure of the dot data conversion circuit 24. As shown in FIG. 7, the polarity inverter section 241 includes an inverter 241-1. In addition, the selection circuit 243 includes AND circuits 243-1 and 243-2, and an OR circuit 243-3 which are connected as shown in FIG. 7.

In the dot data conversion circuit 24 shown in FIG. 7, the corrected dot pattern temporarily stored in the flip-flop 242 is output as it is (that is, a non-conversion output is made) from the selection circuit 243 during a low-level period of the selection signal SEL2, and the inverted dot pattern is output (that is, a converted or inverted output is made) from the selection circuit 243 during a high-level period of the selection signal SEL2. In this embodiment, the output data is held in the flip-flop 244 within the dot data conversion circuit 24, so as to output the corrected dot data in synchronism with the image input clock ICLK.

In this embodiment, the control signals supplied to the dot data conversion circuit 24 include clock signals FF-1CLK and FF-2CLK respectively supplied to the flip-flops 242 and 244, and the selection signal SEL2 supplied to the selection circuit 243. A control signal generator 251 within the pattern matching control circuit 25 generate the clock signals FF-1CLK and FF-2CLK and the selection signal SEL2, based on the match signal from the template matching circuit 23, the image input clock ICLK and a control clock CCLK. The control signal generator 251 similarly generates the selection signal SEL1 which is supplied to the window pattern conversion circuit 22.

Figure 8:
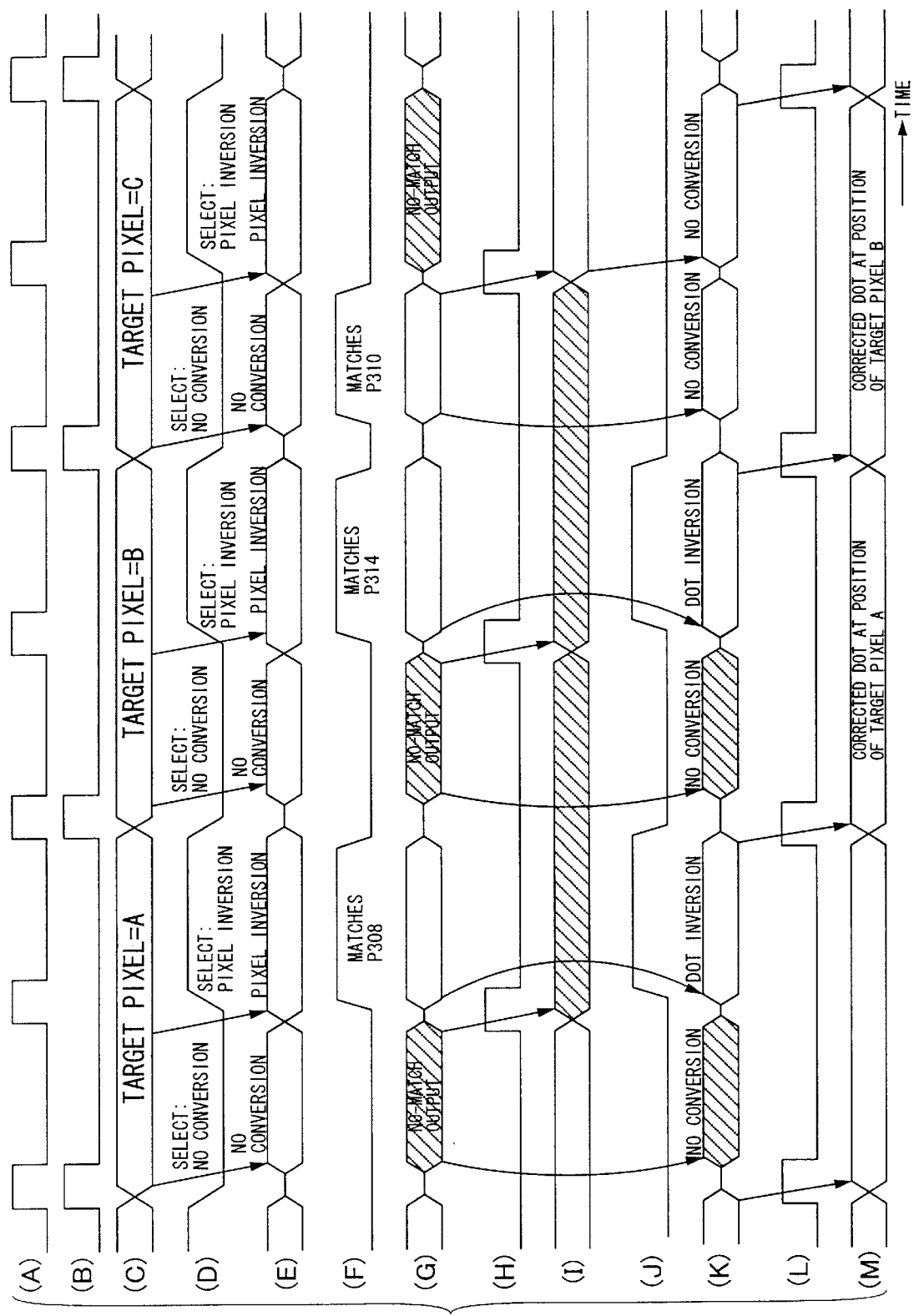
FIG. 8 is a timing chart for explaining an operation of the first embodiment.

FIG. 8 is a timing chart for explaining the operation of this embodiment. In FIG. 8, (A) indicates the control clock CCLK, (B) indicates the image input clock ICLK, (C) indicates the extracted window pattern 35, (D) indicates the selection signal SEL1, (E) indicates the input to the template matching circuit 23 (matching circuit input), (F) indicates the collated result which is output from the template matching circuit 23 when a matching collating pattern exists, (G) indicates the collated result (corrected data) which is output from the template matching circuit 23 when no matching collating pattern exists, (H) indicates the clock signal FF-ICLK of the flip-flop 242 within the dot data conversion circuit 24, (I) indicates the output data (FF-1 data) of the flip-flop 242, (J) indicates the selection signal SEL2, (K) indicates the output data of the selection circuit 243 within the dot data conversion circuit 24, (L) indicates the clock signal FF-2CLK of the flip-flop 244 within the dot data conversion circuit 24, and (M) indicates the output data (FF-2 data) of the flip-flop 244.

FIG. 8 shows that, in a case where the target pixel is A, for example, a collating template having a pattern number P308 matches the inverted window pattern 35I, and as a result, the dot pattern which is obtained by dot inversion of the corrected dot pattern output from the template matching circuit 23 is output as the corrected dot output, that is, the corrected dot at the position of the target pixel A. In addition, in a case where the target pixel is C, a collating template having a pattern number P310 matches the extracted window pattern 35, and as a result, the corrected dot pattern output from the template matching circuit 23 is output as the corrected dot output in synchronism with the next image input clock ICLK. A description will be given later in conjunction with FIG. 9 with respect to the collating templates having pattern numbers P308 and P310.

Figures 9, 10:
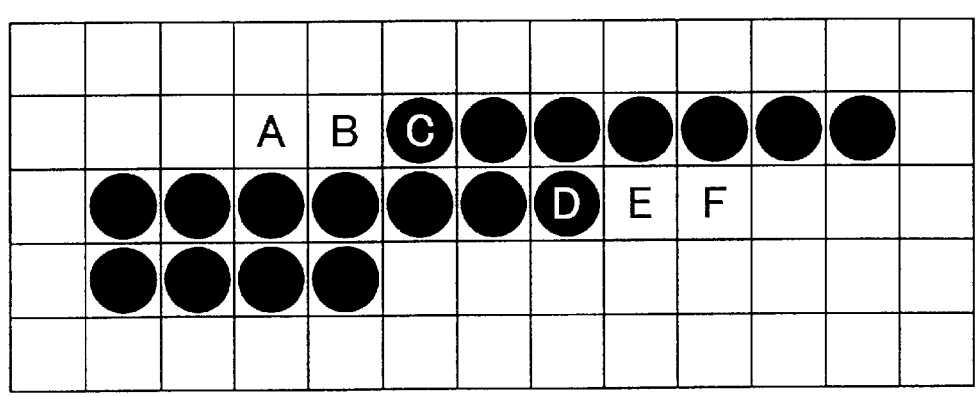
FIG. 9 is a diagram showing collating template patterns and corresponding corrected dot outputs in the first embodiment for some of pattern numbers.
FIG. 10 is a diagram showing image data having a low resolution and to be subjected to dot correction.

FIG. 9 is a diagram showing collating template patterns and corresponding corrected dot outputs in this first embodiment for some of pattern numbers. More particularly, FIG. 9 shows the collating template patterns (collating patterns) of the collating template group 36 for carrying out the dot interpolation described above in conjunction with FIGS. 2A and 2B by extracting the extracted window pattern 35 which is made up of 5 pixels x 5 pixels of the input image data, and the corresponding corrected dot outputs, for some of the pattern numbers P301 through P314. The collating templates shown in FIG. 9 are used for the dot interpolation of the image data shown in FIG. 2A and the image data which is obtained by rotating the image data shown in FIG. 2A by 180 degrees.

In the collating patterns shown FIG. 9, a symbol "•" indicates a pixel position which is not included in the target of the pattern matching, a symbol "●" indicates a position of a black pixel, a symbol "○" indicates the position of a white pixel, and a center of the collating pattern indicates a pixel which is the target of the correction. The pixels which are the target of the correction, that is, the target pixel positions at the center of each of the collating patterns, are all black pixels "●". According to the templates shown in FIG. 9, it is possible to obtain the same effects as when using the conventional templates shown in FIG. 3, but the number of templates shown in FIG. 9 is reduced to one-half that of the templates shown in FIG. 3.

Figure 11:
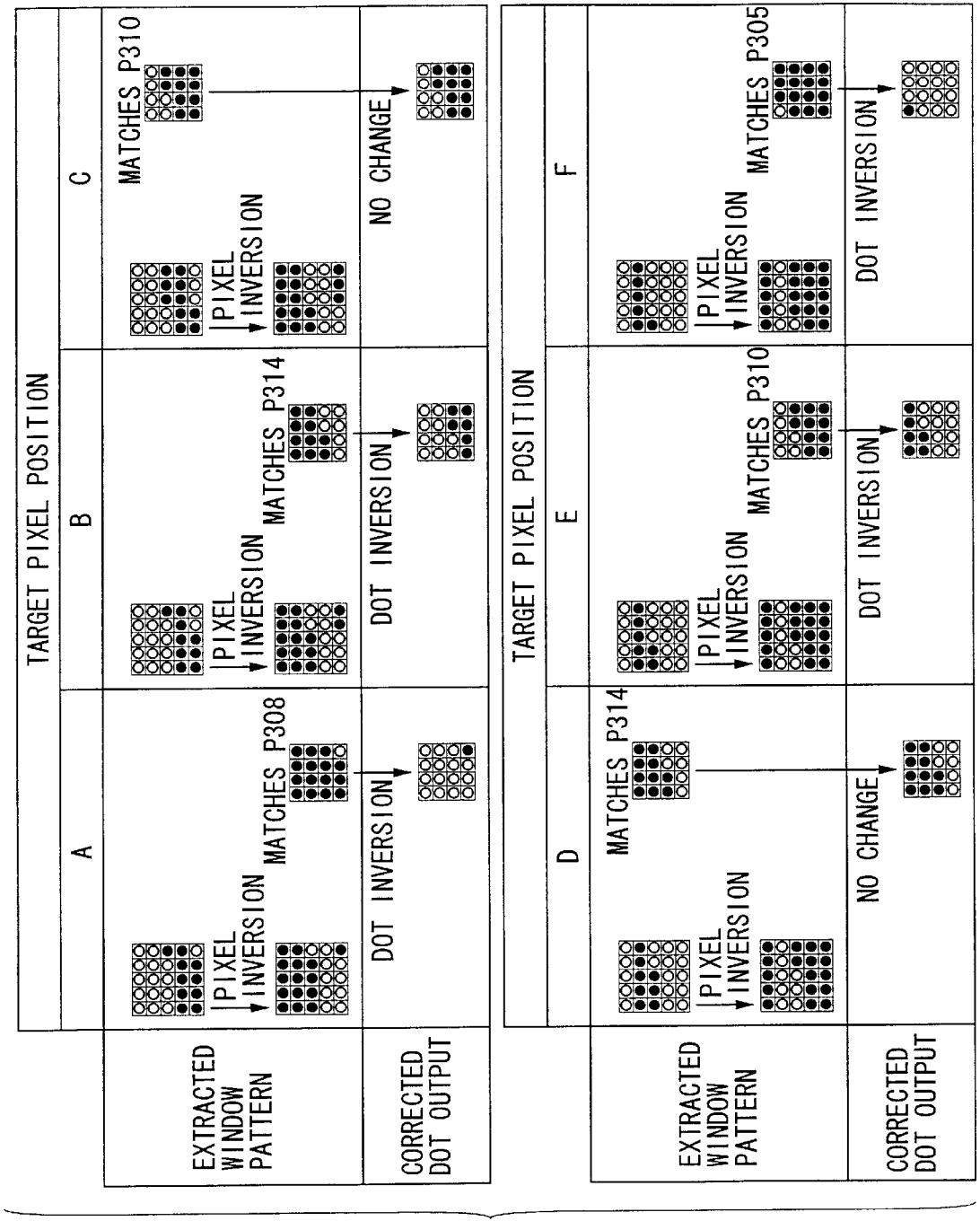
FIG. 11 is a diagram for explaining a smoothing process with respect to the image data shown in FIG. 10.

Next, a description will be given of a smoothing process (dot correction) with respect to the low-resolution image data shown in FIG. 10 using the collating templates shown in FIG. 9, by referring to FIG. 11. FIG. 10 is a diagram showing the low-resolution image data which is to be subjected to the dot correction. FIG. 11 is a diagram for explaining the smoothing process with respect to the image data shown in FIG. 10.

A column A in FIG. 11 shows the dot correcting operation for a case where the pixel A shown in FIG. 10 is the target pixel which is to be subjected to the dot correction. In this case, there is no collating pattern having a pixel arrangement which matches the extracted window pattern 35, but the inverted window pattern 35I which is obtained by inverting the pixel polarity of the extracted window pattern 35 matches the collating pattern having the pattern number P308. For this reason, the corrected dot pattern corresponding to the collating template having the pattern number P308 is obtained, but since the inverted window pattern 35I matches the collating template having the pattern number P308, the dot pattern which is obtained by inverting the dot polarity of the corrected dot pattern corresponding to the collating template having the pattern number P308 is output as the corrected dot output.

Similarly, columns B through F in FIG. 11 respectively show the dot correcting operations for cases where the pixel B through F shown in FIG. 10 are the target pixel which is to be subjected to the dot correction.

Figure 2A:
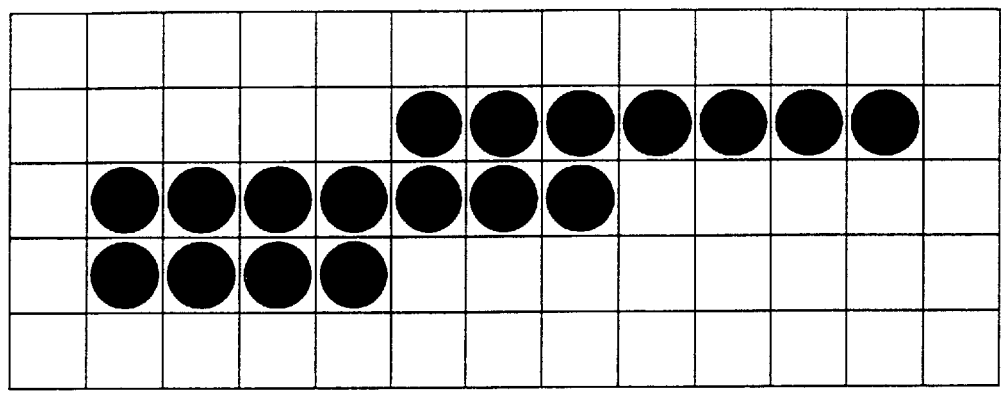
FIGS. 2A and 2B are diagrams for explaining the smoothing process which is carried out by the smoothing circuit shown in FIG. 1.
Figure 2B:
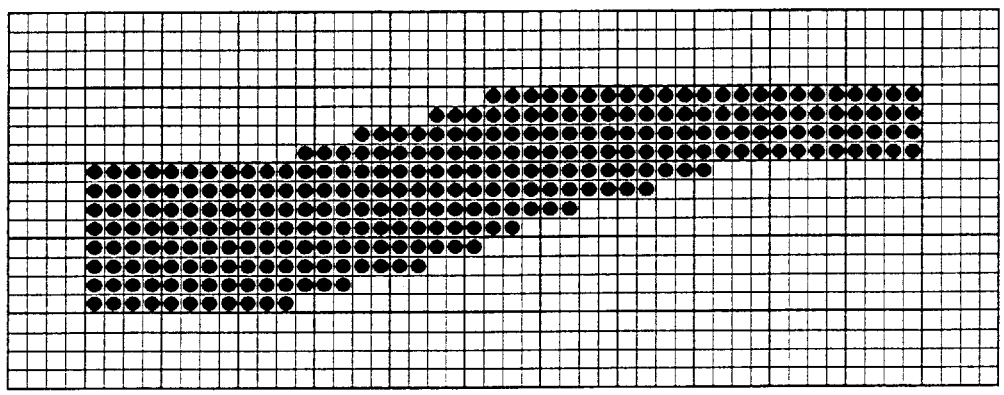

When the smoothing process (dot correction) is carried out in this embodiment using the collating template group 36 shown in FIG. 9, the stepped contour having the low resolution as shown in FIG. 2A is processed into the smooth contour (image data) shown in FIG. 2B having the resolution which is four times that of the stepped contour shown in FIG. 2A, by the dot interpolation, as described above.

Figure 12:
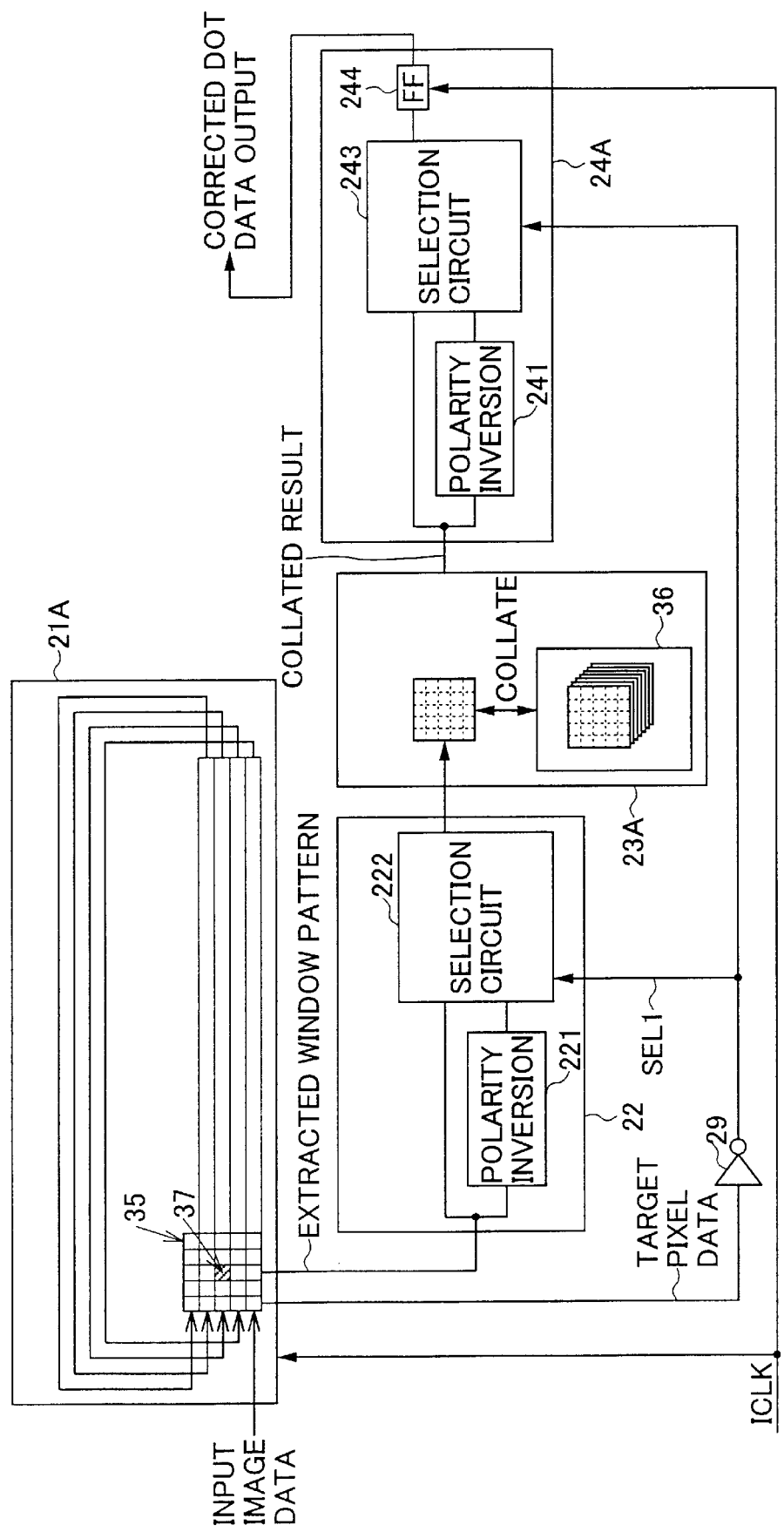
FIG. 12 is a system block diagram showing a second embodiment of the smoothing circuit according to the present invention.

Next, a description will be given of a second embodiment of the smoothing circuit according to the present invention. FIG. 12 is a system block diagram showing this second embodiment of the smoothing circuit. This second embodiment of the smoothing circuit employs a second embodiment of the smoothing method according to the present invention. In FIG. 12, those parts which are the same as those corresponding parts in FIG. 5 are designated by the same reference numerals, and a description thereof will be omitted.

In FIG. 12, an input image buffer 21A has a structure which is basically the same as that of the input image buffer 21 of the first embodiment shown in FIG. 5, but additionally includes an output of the target pixel data which is the target of the dot correction. The output of the target pixel data is inverted by an inverting section 29, and is used as the selection signal SEL1 for the selection circuit 22 within the window pattern conversion circuit 22 and as the selection signal SEL2 for the selection circuit 243 within the dot data conversion circuit 24. The inverting section 29 is formed by an inverter, for example.

In addition, a template matching circuit 23A has a structure which is basically the same as that of the template matching circuit 23 of the first embodiment shown in FIG. 5, but of the collated result, the match signal which indicates the match of the patterns is unnecessary in this embodiment. Thus, the template matching circuit 23A has a structure which does not output the match signal.

A dot data conversion circuit 24A includes a polarity inverting section 241 which generates the inverted dot pattern by inverting the polarity of each dot of the corrected dot pattern input from the template matching circuit 23A, a selection circuit 243 which selectively outputs one of the input corrected dot pattern and the inverted dot pattern depending on the selection signal SEL2 which is received from the inverting section 29, and a flip-flop (FF) 244 which temporarily stores the data in order to output the corrected dot data in synchronism with the image input clock ICLK.

Because the selection signals SEL1 and SEL2 are output from the inverting section 29, the pattern matching control circuit 25 of the first embodiment described above may be omitted in this embodiment.

Figure 13:
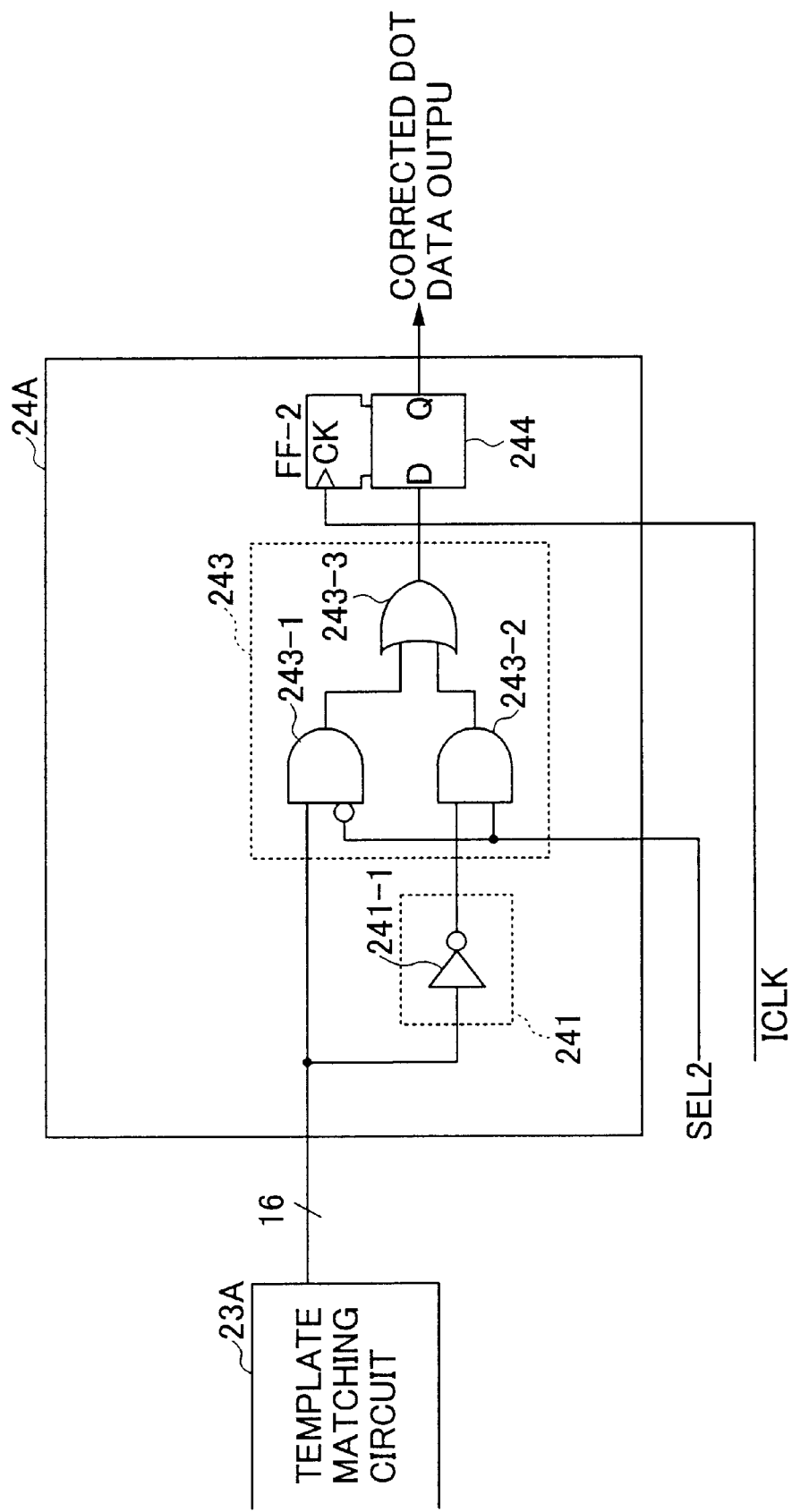
FIG. 13 is a circuit diagram showing a structure of a dot data conversion circuit.

FIG. 13 is a circuit diagram showing a structure of the dot data conversion circuit 24A. In the dot data conversion circuit 24A shown in FIG. 13, the corrected dot pattern input from the template matching circuit 23A is output as it is (that is, a non-conversion output is made) from the selection circuit 243 during a low-level period of the selection signal SEL2, and the inverted dot pattern is output (that is, a converted or inverted output is made) from the selection circuit 243 during a high-level period of the selection signal SEL2. In this embodiment, the output data is held in the flip-flop 244 within the dot data conversion circuit 24A, so as to output the corrected dot data in synchronism with the image input clock ICLK.

According to this embodiment, when the target pixel 37 which is at the center of the extracted window pattern 35 and is the target of the dot correction is white, the window pattern conversion circuit 22 outputs the inverted window pattern 35I in which the polarity of each pixel of the extracted window pattern 35 is inverted. Hence, only the window pattern having the target pixel which is black is input to the template matching circuit 23A.

The template matching circuit 23A outputs the corrected dot pattern with respect to the target pixel (black pixel) of the input window pattern. In a case where the target pixel of the extracted window pattern 35 is white with respect to the corrected dot pattern output from the template matching circuit 23A, the polarity of the dots has been inverted, and thus, the polarity of the dot are inverted in the dot data conversion circuit 24A. The corrected dot data is output from the flip-flop 244 within the dot data conversion circuit 24A in synchronism with the image input clock ICLK.

Figure 14:
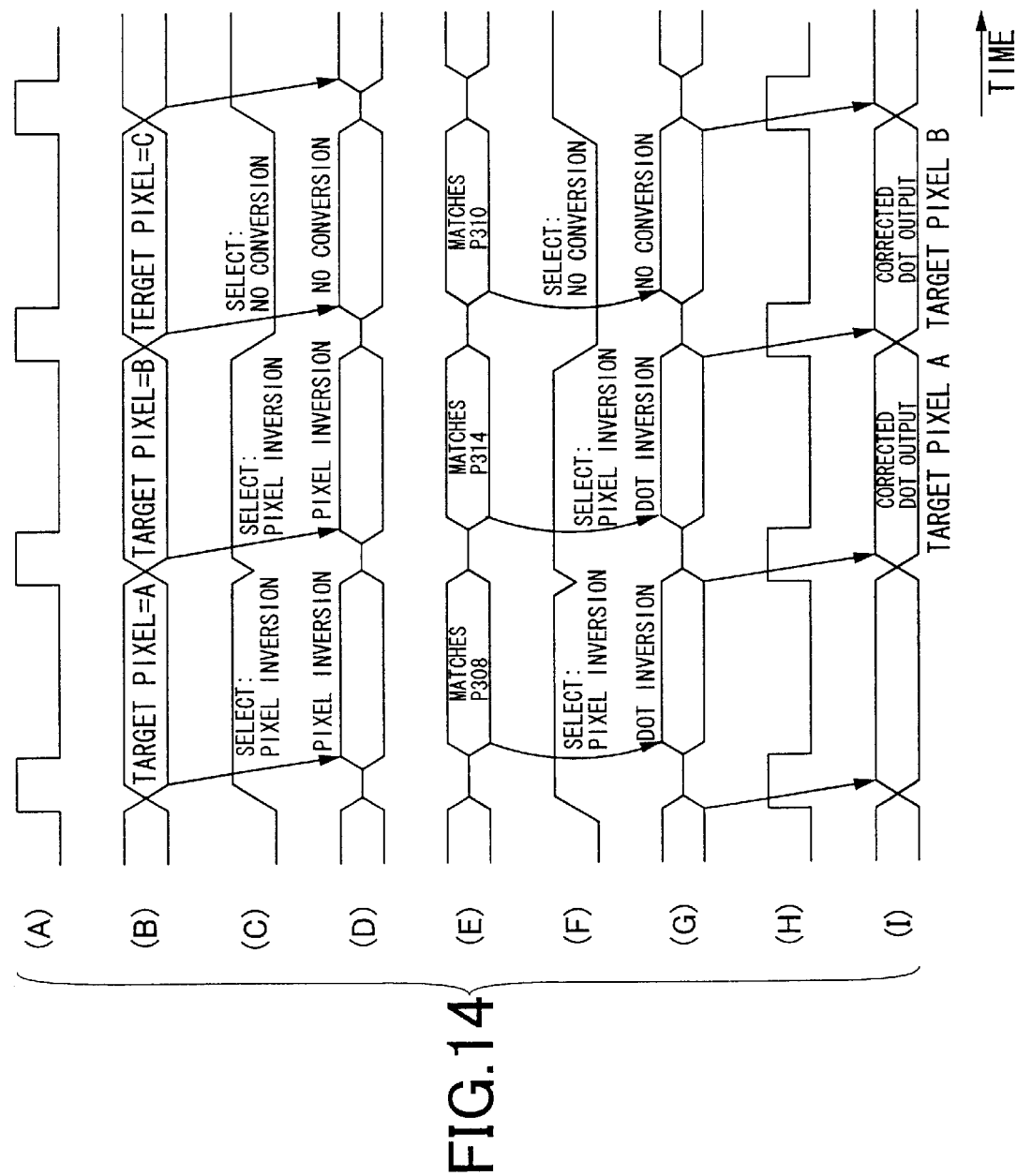
FIG. 14 is a timing chart for explaining an operation of the second embodiment.

FIG. 14 is a timing chart for explaining an operation of this embodiment. In FIG. 14, those parts which are the same as those corresponding parts in FIG. 8 are designated by the same reference numerals, and a description thereof will be omitted. In FIG. 14, (A) indicates the image input clock ICLK, (B) indicates the extracted window pattern 35, (C) indicates the selection signal SEL1, (D) indicates the input of the template matching circuit 23A (matching circuit input), (E) indicates the collated result (corrected data) which is output from the template matching circuit 23A when no matching collating pattern exists, (F) indicates the selection signal SEL2, (G) indicates the output data of the selection circuit 243 within the dot data conversion circuit 24A, (H) indicates the clock signal FF-2CLK of the flip-flop 244 within the dot data conversion circuit 24A, and (I) indicates the output data (FF-2 data) of the flip-flop 244.

FIG. 14 shows that, in a case where the target pixel is A, for example, the target pixel is white, the window pattern conversion circuit 22 outputs the inverted window pattern 35I which is obtained by inverting the polarity of the extracted window pattern 35, a collating template having a pattern number P308 matches the inverted window pattern 35I, and as a result, the dot pattern which is obtained by dot inversion of the corrected dot pattern output from the template matching circuit 23A is output from the dot data conversion circuit 24A as the corrected dot output, that is, the corrected dot at the position of the target pixel A. In addition, in a case where the target pixel is C, the target pixel is black, the window pattern conversion circuit 22 outputs the extracted window pattern 35 as it is, a collating template having a pattern number P310 matches this extracted window pattern 35, and as a result, the corrected dot pattern output from the template matching circuit 23A is output as the corrected dot output in synchronism with the next image input clock ICLK.

When the smoothing process (dot correction) is carried out in this embodiment using the collating template group 36 shown in FIG. 9, the stepped contour having the low resolution as shown in FIG. 2A is processed into the smooth contour (image data) shown in FIG. 2B having the resolution which is four times that of the stepped contour shown in FIG. 2A, by the dot interpolation, as described above.

This embodiment was described for the case where only the collating templates having the target pixels which are black are used. However, it is of course possible in this embodiment to use only the collating templates having the target pixels which are white.

Furthermore, in each of the embodiments described above, the size of the extracted window pattern 35 is not limited to 5 pixels×5 pixels, and a region having an arbitrary shape and an arbitrary size may be used as the extracted window pattern 35.

Moreover, in each of the embodiments described above, the collating template group 36 is provided within the template matching circuit 23 or 23A, but a storage means such as a memory which stores the collating template group 36 may be provided within the template matching circuit 23 or 23A or, provided outside the template matching circuit 23 or 23A.

The input image data in each of the embodiments described above have binary values (black-and-white). However, the present invention is similarly applicable to input image data which are multiple-valued. In other words, in a case where the input image data are multiple-valued, the extracted window pattern may be subjected to a tone inversion about a pixel tone of 50%, so that the number of collating templates may be reduced to approximately one-half that required by the conventional method, similarly to the case where the input image data are binary valued.

However, in the case where the input image data are multiple-valued, the number of collating templates becomes extremely large because the tone element is added to each pixel. Accordingly, it is possible to decompose the multiple-valued input image data for each tone and obtain the binary-valued image data for each tone plane as proposed in a Japanese Laid-Open Patent Application No. 2001-144930, before carrying out the smoothing process of the present invention. In this case, the input image data are treated as binary-valued images in units of each tone plane, and thus, it is possible to carry out the smoothing process of either one of the embodiments described above to smoothen the multiple-valued image.

Figure 15:
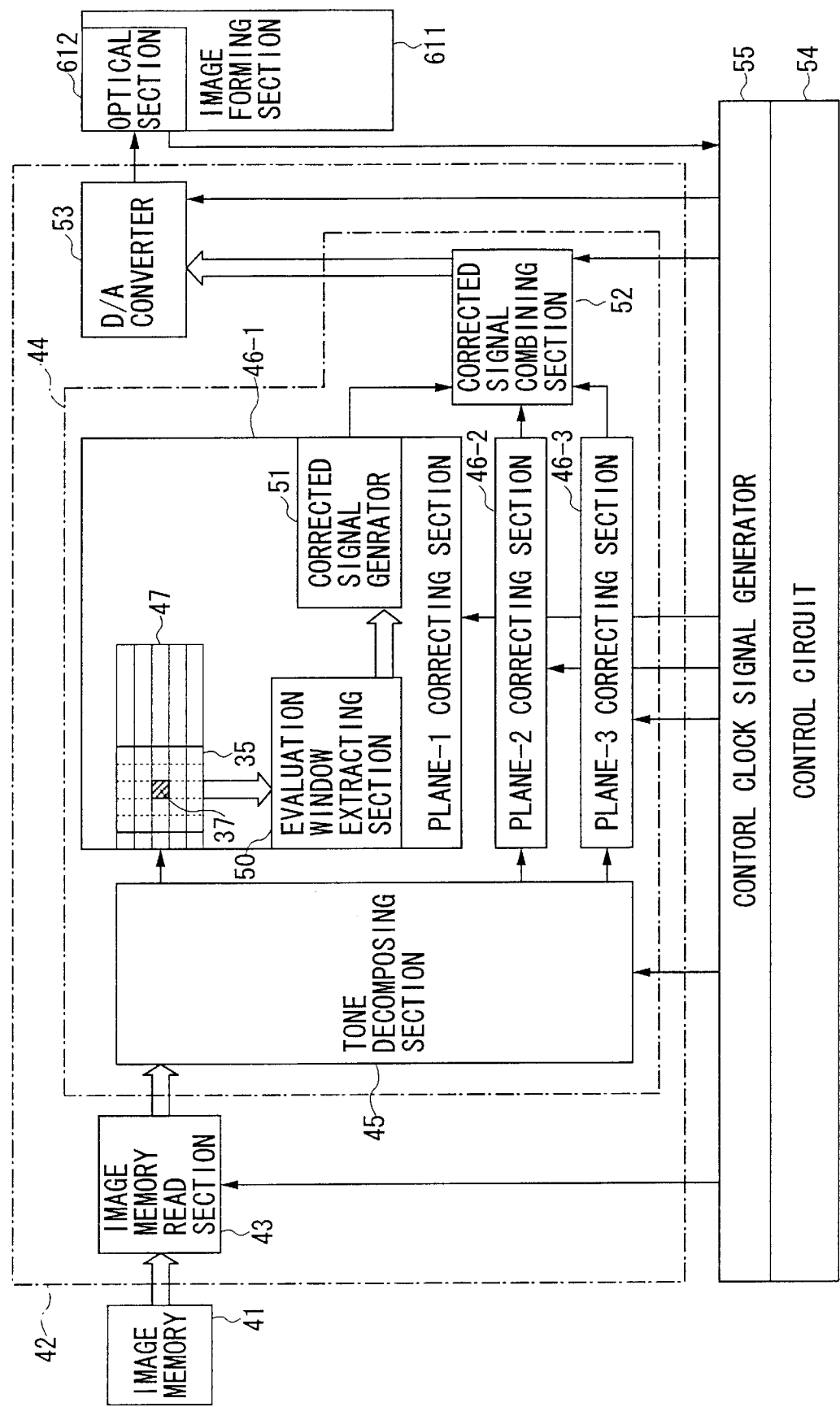
FIG. 15 is a system block diagram showing a structure of an example of a smoothing circuit which carries out a smoothing process with respect to multiple-valued printing data.
Figure 16:
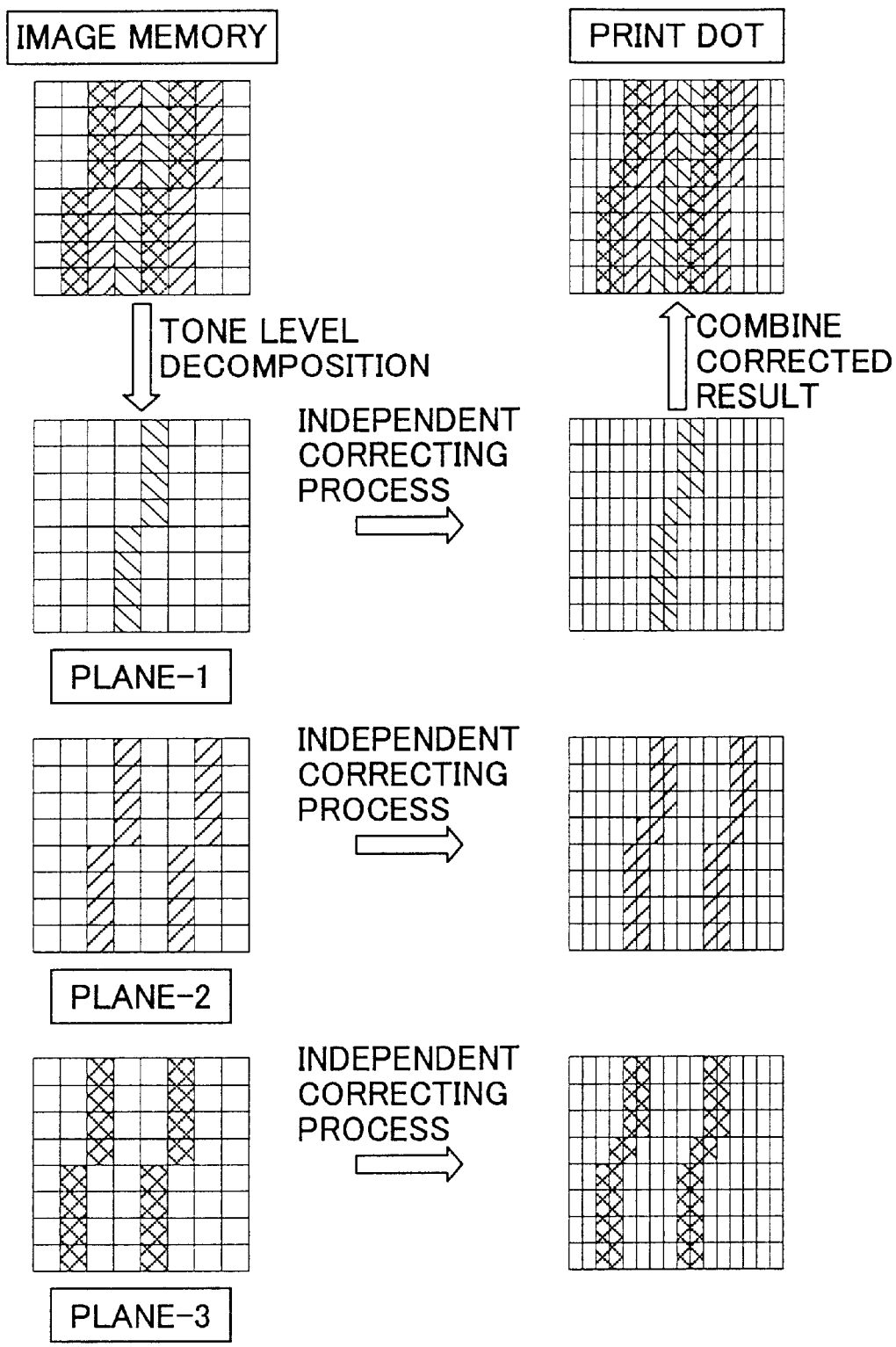
FIG. 16 is a diagram for explaining the smoothing process with respect to the multiple-valued printing data.

In the Japanese Laid-Open Patent Application No. 2001-144930, the multiple-valued input image data are decomposed into a plurality of tone planes depending on the tones which can be represented in units of pixels, the smoothing process is carried out for each tone plane, and corrected signals which are output as a result of the smoothing process with respect to each of the tone planes are combined so as to correct the pixel arrangement, as shown in FIGS. 15 and 16. FIG. 15 is a system block diagram showing a structure of an example of a smoothing circuit which carries out a smoothing process with respect to multiple-valued printing data, and FIG. 16 is a diagram for explaining the smoothing process with respect to the multiple-valued printing data.

A laser printer shown in FIG. 15 includes an optical modulated signal generating circuit 42, and prints in four gradation levels including black and white, in units of printing pixels. A main body (not shown) of the laser printer, an optical section 612 and an image forming section 611 have known structures. An image memory 41 is formed by a 2-bit bit-map-memory. Image data are developed in advance in the image memory 41 by an image developing section (not shown) in a printable state. Three tone planes are prepared because three gradation levels can be represented in units of printing pixels excluding white. For the sake of convenience, the tone of the printing pixels are denoted by numerical values 0 through 3, with the larger numerical value indicating a higher (darker) tone, so that the tone 0 corresponds to white and the tone 3 corresponds to black.

The optical modulated signal generating circuit 42 is controlled to output the optical modulated signal in synchronism with the progress of the image write operation in the main body, in response to a plurality of control clock signals which are generated from a control clock signal generator 55 of a control circuit 54 based on an optical scan timing signal which is output from the optical section 612.

The multiple-valued image data which are read from the image memory 41 by an image memory read section 43 are supplied to a tone decomposing section 45. The tone decomposing section 45 distributively outputs the binarized pixel data to plane-1 correcting sections 46-1 through plane-3 correcting sections 46-3, according to a predetermined distribution rule, based on the tone of the pixel.

Each of the plane-1 correcting section 46-1, the plane-2 correcting section 46-2 and the plane-3 correcting section 46-3 carries out a smoothing process with respect to the input pixel data by a line buffer (shift register) 47, an evaluation window extracting section 50 and a corrected signal generator 51, and outputs a corrected signal having a corresponding level. Hence, the line buffer 47 may be made to correspond to the input image buffer 21 or 21A of each of the above described embodiments, and the evaluation window extracting section 50 and the corrected signal generator 51 may be made to correspond to a circuit part including the window pattern conversion circuit 22, the template matching circuit 23 or 23A and the dot data conversion circuit 24 or 24A of each of the above described embodiments. The binarized pixel data are input to each of the plane-1 correcting section 46-1, the plane-2 correcting section 46-2 and the plane-3 correcting section 46-3. For this reason, each of the plane-1 correcting section 46-1, the plane-2 correcting section 46-2 and the plane-3 correcting section 46-3 may have the same structure as that of the conventional monochromatic binary printer, and the same correcting rule as the conventional monochromatic binary printer may be applied thereto. The corrected signals output from the plane-1 correcting section 46-1, the plane-2 correcting section 46-2 and the plane-3 correcting section 46-3 are combined in a corrected signal combining section 52 according to a predetermined combining rule, and a combined output is supplied to a digital-to-analog (D/A) converter 53. An output of the D/A converter 53 is applied to a laser diode of the optical section 612 as an optical modulated signal.

According to the predetermined distribution rule employed by the tone decomposing section 45, the pixel data are distributed by decomposing the tones in a plane for every pixel tone in the image memory 41, for example. Hence, the pixel data having the tone 1 are distributed in the plane-1 within the image memory 41, the pixel data having the tone 2 are distributed in the plane-2 within the image memory 41, and the pixel data having the tone 3 are distributed in the plane-3 within the image memory 41. In addition, according to the predetermined combining rule employed in the corrected signal combining section 52, if non-zero planes exist for the same printing pixel, for example, the corrected signal of the plane having the highest tone is output of such planes.

In the pattern shown in FIG. 16, a jaggy exists at an intermediate portion of a vertical line. More particularly, two dark vertical lines having the tone 3 are provided on both sides, and lighter vertical lines respectively having the tones 1 and 2 are provided between the two dark vertical lines, so that the lighter vertical line having the tone 2 is located on the right of the lighter vertical line having the tone 1. This pattern is developed in the bit-map-memory forming the image memory 41, as indicated at the top left of FIG. 16. This pattern is distributed to each of the plane-1, the plane-2 and the plane-3 as indicated on the left side in FIG. 16, and a smoothing process is carried out independently for each plane as indicated on the right side in FIG. 16. When the three corrected signals from the three planes are combined according to the predetermined combining rule described above, a print result (printed dots) shown at the top right of FIG. 16 is obtained.

Figure 17:
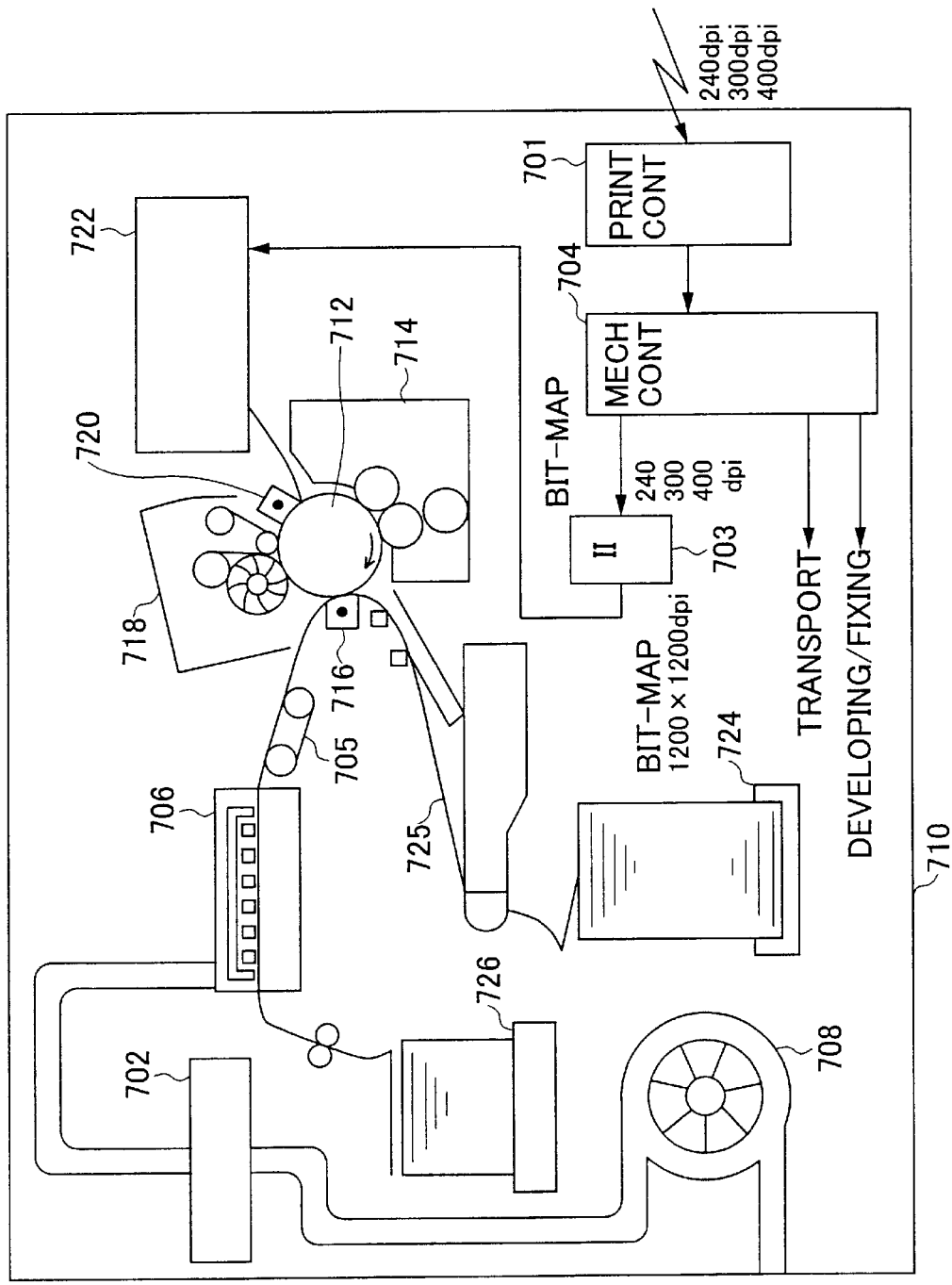
FIG. 17 is a diagram for explaining an image forming apparatus to which the present invention may be applied.

Next, a description will be given of a case where the image output section 12 of the image output apparatus shown in FIG. 4 is made of an image forming apparatus such as an electrophotography type printer which forms processed image data on a recording medium such as paper. FIG. 17 is a diagram for explaining the image forming apparatus to which the present invention may be applied.

In FIG. 17, a main printer body 710 of an electrophotography type printer 710 is formed by an electrophotography mechanism. A photoconductive drum 712 is charged by a charger 720, and an image is exposed on the photoconductive drum 712 by a laser exposure unit 722. As a result, a latent image is formed on the photoconductive drum 712. A developer 714 supplies a two-component developing agent (toner) to the photoconductive drum 712, so as to develop the latent image into a toner image. A transfer unit 716 transfers the toner image formed on the photoconductive drum 712 onto a recording medium 725 such as a continuous paper. A cleaning mechanism 718 removes the charge and the residual toner from the photoconductive drum 712 after the transfer of the toner image.

The recording medium 725 is folded and stacked on a hopper 724. The recording medium 725 on the hopper 724 is transported to a transfer position by a transport mechanism 705, and thereafter passes a flash fixing unit 706 before being accommodated by a stacker 726. The flash fixing unit 706 fixes the toner image on the recording medium 725 by a flash (light).

The electrophotography type printer 710 is capable of printing at a high speed of over 100 pages per minute, for example. For this reason, the amount of sublimation component of the toner due to the flash fixing is large. A filter 702 and an exhaust fan 708 are provided to eliminate this sublimation component.

A printer controller 701, a mechanical controller 704 and an image processing circuit 703 are provided in the electrophotography type printer 710. The printer controller 701 analyzes commands from a host unit (not shown), and generates internal commands and print data (bit-map-data). The mechanical controller 704 controls the transport mechanism 705 and the developing-related and fixing-related mechanisms 714, 716 and 706 depending on the internal commands. Further, the mechanical controller 704 outputs the print data to the image processing circuit 703.

The image processing circuit 703 carries out an image processing including a smoothing process with respect to the bit-map-data having a low density such as 240 dpi, 300 dpi and 400 dpi, before driving the laser exposure unit 722. Hence, the low-density image data is converted into high-density image data by the dot correction, and is formed (printed) on the recording medium 725. The image processing circuit 703 corresponds to the image processing section 11 shown in FIG. 4. Accordingly, in the case shown in FIG. 17, the image processing section 11 is provided within the image output section 12.

Further, the present invention is not limited to these embodiments, but various variations and modifications may be made without departing from the scope of the present invention.

What is claimed is:

1. A smoothing method comprising the steps of:
   (a) selectively outputting one of an extracted window pattern which is obtained by extracting a region having a predetermined size with a target pixel formed by each pixel of an input image data, and an inverted window pattern which is obtained by inverting a polarity of each pixel of the extracted window pattern;
   (b) collating an output window pattern which is output by said step (a) with a plurality of collating templates, and outputting corrected dot data corresponding to one of the collating templates matching the output window pattern; and
   (c) selectively outputting one of the corrected dot data output by said step (b), and an inverted corrected dot data which is obtained by inverting a polarity of each dot of the corrected dot data.

2. The smoothing method as claimed in claim 1, wherein:
   said step (a) time-divisionally switches and outputs the extracted window pattern and the inverted window pattern; and
   said step (c) outputs the corrected dot data when one of the collating templates matches the extracted window pattern, and outputs the inverted corrected dot data when one of the collating templates matches the inverted window pattern.

3. The smoothing method as claimed in claim 1, wherein:
   said step (a) switches and outputs the extracted window pattern and the inverted window pattern depending on a polarity of the target pixel of the extracted window pattern; and
   said step (c) switches and outputs the corrected dot data and the inverted corrected dot data depending on the polarity of the target pixel of the extracted window pattern.

4. The smoothing method as claimed in claim 1, wherein the extracted window pattern is formed by a rectangular region, and the target pixel is located at a center of the rectangular region.

5. A smoothing circuit comprising:
   a window pattern conversion circuit which receives an extracted window pattern which is obtained by extracting a region having a predetermined size with a target pixel formed by each pixel of an input image data, and selectively outputs one of the extracted window pattern and an inverted window pattern which is obtained by inverting a polarity of each pixel of the extracted window pattern;
   a template matching circuit which collates an output window pattern which is output by said window pattern conversion circuit with a plurality of collating templates, and outputs corrected dot data corresponding to one of the collating templates matching the output window pattern; and
   a dot data conversion circuit which selectively outputs one of the corrected dot data output by said template matching circuit, and an inverted corrected dot data which is obtained by inverting a polarity of each dot of the corrected dot data.

6. The smoothing circuit as claimed in claim 5, wherein:
   said window pattern conversion circuit time-divisionally switches and outputs the extracted window pattern and the inverted window pattern; and
   said dot data conversion circuit outputs the corrected dot data when one of the collating templates matches the extracted window pattern, and outputs the inverted corrected dot data when one of the collating templates matches the inverted window pattern.

7. The smoothing circuit as claimed in claim 5, wherein:
   said window pattern conversion circuit switches and outputs the extracted window pattern and the inverted window pattern depending on a polarity of the target pixel of the extracted window pattern; and
   said dot data conversion circuit switches and outputs the corrected dot data and the inverted corrected dot data depending on the polarity of the target pixel of the extracted window pattern.

8. The smoothing circuit as claimed in claim 5, wherein the extracted window pattern is formed by a rectangular region, and the target pixel is located at a center of the rectangular region.

9. The smoothing circuit as claimed in claim 5, wherein the input image data has a binary-valued or a multiple-valued.

10. An image forming apparatus comprising:

a smoothing circuit; and an image forming section which forms an image on a recording medium based on an output of said smoothing circuit, said smoothing circuit comprising:

a window pattern conversion circuit which receives an extracted window pattern which is obtained by extracting a region having a predetermined size with a target pixel formed by each pixel of an input image data, and selectively outputs one of the extracted window pattern and an inverted window pattern which is obtained by inverting a polarity of each pixel of the extracted window pattern;

a template matching circuit which collates an output window pattern which is output by said window pattern conversion circuit with a plurality of collating templates, and outputs corrected dot data corresponding to one of the collating templates matching the output window pattern; and a dot data conversion circuit which selectively outputs one of the corrected dot data output by said template matching circuit, and an inverted corrected dot data which is obtained by inverting a polarity of each dot of the corrected dot data.

11. The image forming apparatus as claimed in claim 10, wherein:

said window pattern conversion circuit time-divisionally switches and outputs the extracted window pattern and the inverted window pattern; and said dot data conversion circuit outputs the corrected dot data when one of the collating templates matches the extracted window pattern, and outputs the inverted corrected dot data when one of the collating templates matches the inverted window pattern.

12. The image forming apparatus as claimed in claim 10, wherein:

said window pattern conversion circuit switches and outputs the extracted window pattern and the inverted window pattern depending on a polarity of the target pixel of the extracted window pattern; and said dot data conversion circuit switches and outputs the corrected dot data and the inverted corrected dot data depending on the polarity of the target pixel of the extracted window pattern.

13. The image forming apparatus as claimed in claim 10, wherein the extracted window pattern is formed by a rectangular region, and the target pixel is located at a center of the rectangular region.

14. The image forming apparatus as claimed in claim 10, wherein the input image data has a binary-valued or a multiple-valued.

15. A display unit comprising:

a smoothing circuit; and a display section which displays an image based on an output of said smoothing circuit, said smoothing circuit comprising:

a window pattern conversion circuit which receives an extracted window pattern which is obtained by extracting a region having a predetermined size with a target pixel formed by each pixel of an input image data, and selectively outputs one of the extracted window pattern and an inverted window pattern which is obtained by inverting a polarity of each pixel of the extracted window pattern;

a template matching circuit which collates an output window pattern which is output by said window pattern conversion circuit with a plurality of collating templates, and outputs corrected dot data corresponding to one of the collating templates matching the output window pattern; and a dot data conversion circuit which selectively outputs one of the corrected dot data output by said template matching circuit, and an inverted corrected dot data which is obtained by inverting a polarity of each dot of the corrected dot data.

16. The display unit as claimed in claim 15, wherein:

said window pattern conversion circuit time-divisionally switches and outputs the extracted window pattern and the inverted window pattern; and said dot data conversion circuit outputs the corrected dot data when one of the collating templates matches the extracted window pattern, and outputs the inverted corrected dot data when one of the collating templates matches the inverted window pattern.

17. The display unit as claimed in claim 15, wherein:

said window pattern conversion circuit switches and outputs the extracted window pattern and the inverted window pattern depending on a polarity of the target pixel of the extracted window pattern; and said dot data conversion circuit switches and outputs the corrected dot data and the inverted corrected dot data depending on the polarity of the target pixel of the extracted window pattern.

18. The display unit as claimed in claim 15, wherein the extracted window pattern is formed by a rectangular region, and the target pixel is located at a center of the rectangular region.

19. The display unit as claimed in claim 15, wherein the input image data has a binary-valued or a multiple-valued.

* * * * *